United States Patent
Rezaee et al.

(10) Patent No.: US 11,800,422 B2
(45) Date of Patent: Oct. 24, 2023

(54) OPTIMIZATION OF COMMUNICATIONS IN A LOW EARTH ORBIT (LEO) SATELLITE NETWORK

(71) Applicant: Cisco Technology, Inc., San Jose, CA (US)

(72) Inventors: Arman Rezaee, Seattle, WA (US); Ali Sajassi, San Ramon, CA (US); Alessandro Erta, Licciana Nardi (IT); Elango Ganesan, Palo Alto, CA (US); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 265 days.

(21) Appl. No.: 17/390,445

(22) Filed: Jul. 30, 2021

(65) Prior Publication Data
US 2022/0225201 A1     Jul. 14, 2022

Related U.S. Application Data

(60) Provisional application No. 63/136,445, filed on Jan. 12, 2021.

(51) Int. Cl.
*H04B 7/185*     (2006.01)
*H04W 36/30*    (2009.01)
*H04L 45/50*     (2022.01)

(52) U.S. Cl.
CPC ........ *H04W 36/30* (2013.01); *H04B 7/18521* (2013.01); *H04B 7/18541* (2013.01); *H04L 45/50* (2013.01)

(58) Field of Classification Search
CPC ............ H04W 36/30; H04W 36/00837; H04B 7/18521; H04B 7/18541; H04L 45/50
(Continued)

(56) References Cited

U.S. PATENT DOCUMENTS 9,681,337 B2 *  6/2017  Davis ................ H04W 36/0005
9,769,708 B2    9/2017  Bisti et al.
(Continued)

FOREIGN PATENT DOCUMENTS

WO    2018148920 A1    8/2018
WO    2020074887 A1    4/2020

OTHER PUBLICATIONS

Donner, et al., "An MPLS Networking Concept for Satellite Constellations", Conference: 18th International Teletraffic Congress, Providing QoS in Heterogeneous Environments, Aug. 31-Sep. 5, 2003, 11 pages, Berlin, Germany.

*Primary Examiner* — Amancio Gonzalez
(74) *Attorney, Agent, or Firm* — BEHMKE INNOVATION GROUP LLC; James M. Behmke; Jonathon P. Western

(57) ABSTRACT

In one embodiment, an earthbound transceiver in a low earth orbit (LEO) satellite network establishes a connection with a first LEO satellite from a first set of LEO satellites. The first set of LEO satellites are distributed across a first plurality of orbits including first neighboring LEO satellites of the first LEO satellite, and the first neighboring LEO satellites have a fixed or semi-fixed position relative to the first LEO satellite. The earthbound transceiver determines first signal strength values associated with the first set of LEO satellites and second signal strength values associated with a second set of LEO satellites. The earthbound transceiver then periodically compares the first signal strength values to the second signal strength values. At an optimal handoff time, the earthbound transceiver initiates the handoff operation from the first LEO satellite to a second LEO satellite from the second set of LEO satellites.

20 Claims, 12 Drawing Sheets

(58) Field of Classification Search
USPC .......................................................... 370/316
See application file for complete search history.

(56) References Cited

U.S. PATENT DOCUMENTS

| | | | |
|---|---|---|---|
| 10,244,453 B2* | 3/2019 | Ashrafi | H04W 36/30 |
| 10,341,010 B2* | 7/2019 | Jalali | H04W 36/0085 |
| 10,348,396 B2* | 7/2019 | Olson | H04B 7/18523 |
| 10,484,113 B1 | 11/2019 | Benedetto et al. | |
| 10,523,312 B1* | 12/2019 | Tong | H04B 7/18513 |
| 10,894,618 B2* | 1/2021 | Fortezza | H04B 7/18515 |
| 10,965,365 B2 | 3/2021 | Foxworthy et al. | |
| 11,190,268 B2* | 11/2021 | Lindqvist | H04B 7/1858 |
| 11,412,549 B2* | 8/2022 | Roy | H04W 36/08 |
| 11,542,040 B1* | 1/2023 | Hemmati | B64G 3/00 |
| 2021/0136641 A1* | 5/2021 | Roy | H04W 56/0015 |
| 2021/0266062 A1* | 8/2021 | Goto | H04B 7/208 |

* cited by examiner

OPTIMIZATION OF COMMUNICATIONS IN A LOW EARTH ORBIT (LEO) SATELLITE NETWORK

CROSS-REFERENCE TO RELATED APPLICATION

This application claims priority to U.S. Provisional Application No. 63/136,445, filed on Jan. 12, 2021, entitled OPTIMUM FORWARDING IN A LOW EARTH ORBIT (LEO) SATELLITE NETWORK, by Ali Sajassi, et al., the entire contents of which are incorporated by reference herein.

TECHNICAL FIELD

The present disclosure generally relates to satellite networks, and more specifically to optimization of communications in a Low Earth Orbit (LEO) satellite network.

BACKGROUND

Orbital regions around the earth include Low Earth Orbit (LEO), Medium Earth Orbit (MEO), and High Earth Orbit (HEO). LEO, MEO, and HEO have been described in various manners (e.g., based on altitude or based on orbital period), with LEO nearest the Earth, located within 2,000 kilometers of the Earth's surface—a much shorter distance than that of other types of satellites (e.g., global positioning system (GPS) satellites, etc.)—followed by MEO, and then HEO. In general, most man-made satellites are considered to be in LEO.

LEO satellite use is becoming increasingly ubiquitous. Several LEO satellite networks have been launched and/or are planned for launch to blanket the Earth's LEO orbits and provide broadband Internet services to most of the Earth. Because LEO satellites fly closer to Earth than other satellites, they provide significantly lower latency or propagation delay, essential for safe and reliable communications. For example, SpaceX plans to launch about 42,000 satellites (including 12,000 satellites in its first phase), and Amazon's Kuiper project plans to launch 3,200 satellites in its first phase. These LEO systems consist of not only LEO satellites, but also earthbound transceivers or ground stations serving as gateways to the Internet and user terminals for connecting Internet users to the satellite network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
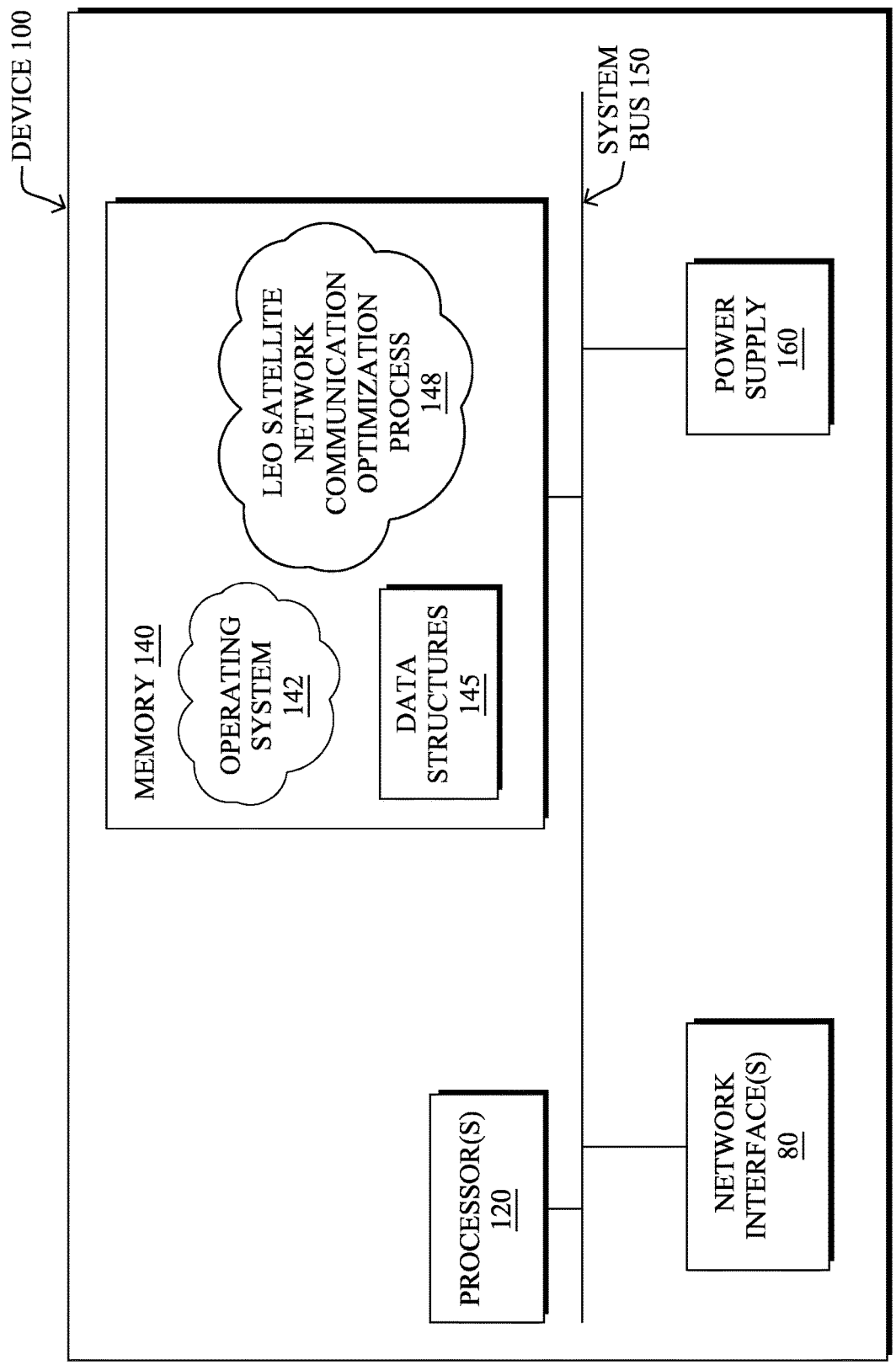
FIG. 1 illustrates a schematic block diagram of an example network device/node.

According to one or more embodiments of the disclosure, an earthbound transceiver in a low earth orbit (LEO) satellite network establishes a connection with a first LEO satellite from a first set of LEO satellites. The first set of LEO satellites are distributed across a first plurality of orbits including first neighboring LEO satellites of the first LEO satellite, and the first neighboring LEO satellites have a fixed or semi-fixed position relative to the first LEO satellite. The earthbound transceiver determines first signal strength values associated with the first set of LEO satellites and second signal strength values associated with a second set of LEO satellites. The second set of LEO satellites are distributed across a second plurality of orbits. The earthbound transceiver then periodically compares the first signal strength values to the second signal strength values to determine an optimal handoff time at which a handoff operation should be performed. At the optimal handoff time, the earthbound transceiver initiates the handoff operation from the first LEO satellite to a second LEO satellite from the second set of LEO satellites by disconnecting from the first LEO satellite and establishing a new connection with the second LEO satellite

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Relatedly, a satellite network is a geographically distributed collection of interconnected satellite nodes in communication with earthbound (or ground) transceivers. Satellite networks may take many various forms, such as a Low Earth Orbit (LEO) satellite network, but generally comprise a topology with network elements of two categories: elements located in space and elements located on the ground (i.e., terrestrial elements). Referring first to the former category, satellite networks comprise a constellation of satellites organized in equally spaced orbits. A constellation of satellites refers to a group of satellites working together as a system (e.g., to provide broadband Internet services). Each satellite employs several technologies for enabling advanced data processing and communication such as optical inter-satellite links, phased array beam-forming, and other digital processing techniques. These networks may be categorized according to their architecture in space. For instance, single-layer (one shell) satellite networks provide intercommunication only between satellites of the same altitude. Multi-layer satellite networks, on the other hand, enable communications between satellites in different shells.

The other category of elements comprising a satellite network refers to network elements on the ground that communicate with the orbiting LEO satellites. These elements include earthbound transceivers (or satellite receivers) may be understood in a general sense to refer to a terrestrial-based element capable of communicating with a satellite, e.g., by transmitting signals to the satellite, receiving signals from the satellite, or both. Earthbound transceivers, basically, fall into one of two categories. First, user stations or user terminals are intended to connect Internet users to the satellite network. The user terminals may consist of small, portable antennas that operate as an access point for the user. User terminals may include a dish and antenna, for example, capable of locking or unlocking communication with the satellites. The user terminal may also be referred to as a home station. Second, ground stations are intended to serve as gateways to one or more terrestrial networks. These stations are larger radio stations designed specifically for extraplanetary telecommunication. The ground stations may comprise a well-equipped station capable of connecting a large number of user terminals to the Internet or other private terrestrial network. Whereas the user terminals are designed specifically to support an individual end user, ground stations are responsible for the operation, control, and maintenance of the satellites. Because ground stations tend to be relatively expensive, there are far fewer ground stations than satellites or user terminals. In many implementations, the user terminals may communicate with the satellites directly, and communicate with other ground transceivers via the satellites; in other implementations, the user terminals may communicate with satellites only via the ground stations. Ground elements may also include network gateways to enable the provision of broadband Internet services. The gateways may function as an interface between the satellite network and the Internet. Generally speaking, the establishment of an Internet connection requires a user terminal to send a control signal to a satellite that is available for transmission. Upon establishing the connection, the user terminal is able to send a receive packets directly from the satellite network.

FIG. 1 is a schematic block diagram of an example node/device 100 that may be used with one or more embodiments described herein, e.g., as a computing device of a ground station, user terminal, network gateway, or any other computing device that supports the operations of a LEO satellite network as described herein, or any of the other devices referenced herein. The device 100 may also be any other suitable type of device depending upon the type of network architecture in place. Device 100 comprises one or more network interfaces 110, one or more processors 120, and a memory 140 interconnected by a system bus 150, and is powered by a power supply 160.

The network interfaces 110 include the mechanical, electrical, and signaling circuitry for communicating data over physical links coupled to the network. The network interfaces may be configured to transmit and/or receive data using a variety of different communication protocols. Notably, a physical network interface 110 may also be used to implement one or more virtual network interfaces, such as for virtual private network (VPN) access, known to those skilled in the art.

The memory 140 comprises a plurality of storage locations that are addressable by the processor(s) 120 and the network interfaces 110 for storing software programs and data structures associated with the embodiments described herein. The processor 120 may comprise necessary elements or logic adapted to execute the software programs and manipulate the data structures 145. An operating system 142 (e.g., the Internetworking Operating System, or IOS®, of Cisco Systems, Inc., another operating system, etc.), portions of which are typically resident in memory 140 and executed by the processor(s), functionally organizes the node by, inter alia, invoking network operations in support of software processors and/or services executing on the device. These software processors and/or services may comprise a LEO satellite network communication optimization process 148, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Several examples now follow for the demonstration of LEO satellite networks. It should be understood that some of these examples are provided for with simplicity of explanation in mind. For example, various aspects LEO satellite networks are described using simple terms, e.g., an orbit as circular or elliptical, adjacent orbits as parallel, the position of a satellite as fixed (or semi-fixed) relative to certain neighboring satellites, the direction or speed of the satellite as the same as certain neighboring satellites, and so on. It should be understood that these examples permit some degree of variability or margin of error, for example, due to irregularities caused by the Earth's mass not being evenly distributed.

Figure 2:
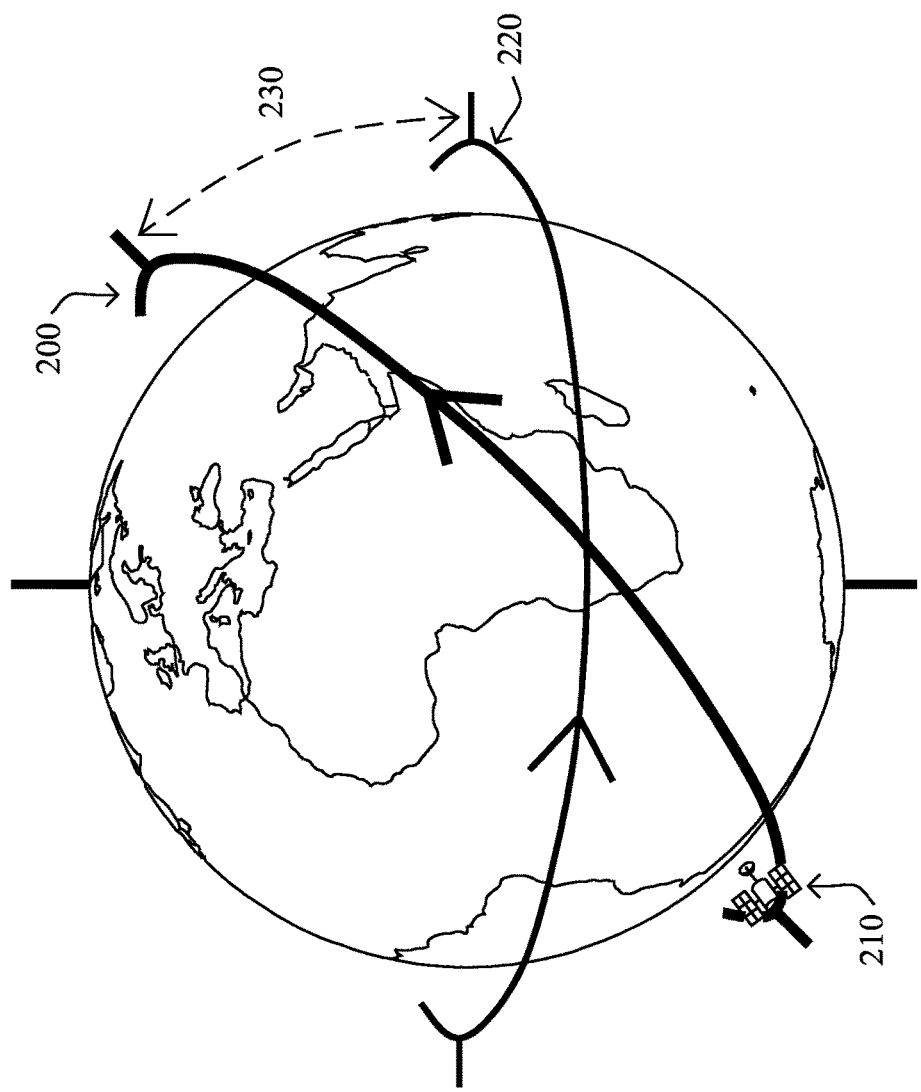
FIG. 2 illustrates an example geocentric orbit of a satellite orbiting the Earth.

FIG. 2 illustrates an example geocentric orbit of a satellite orbiting the Earth. LEO satellites orbit around the Earth in a circular or elliptical pattern known as a geocentric orbit. The orbital inclination 230 refers to the tilt of the orbital plane 200 with respect to the equatorial plane 220 defined by the Earth's equator. FIG. 2 also indicates the directions of rotation for both the LEO satellite orbit 200 and the Earth. Notably, the satellite 210 and the Earth are moving relative to one another on different planes. Whereas an earthbound transceiver located on the ground moves in a direction corresponding to the rotation of the Earth (i.e., along the equatorial plane), the satellite 210 orbits the Earth along the orbital plane 210 offset by the orbital inclination 230 from the equatorial plane 220, typically in an eastward direction along a NE/SE axis. This phenomenon presents challenges when attempting to establish reliable and consistent connections in the satellite network. Since the satellite and earthbound transceiver will eventually move out of range of one another, a handoff must occur between the earthbound transceiver and a different satellite.

Figure 3:
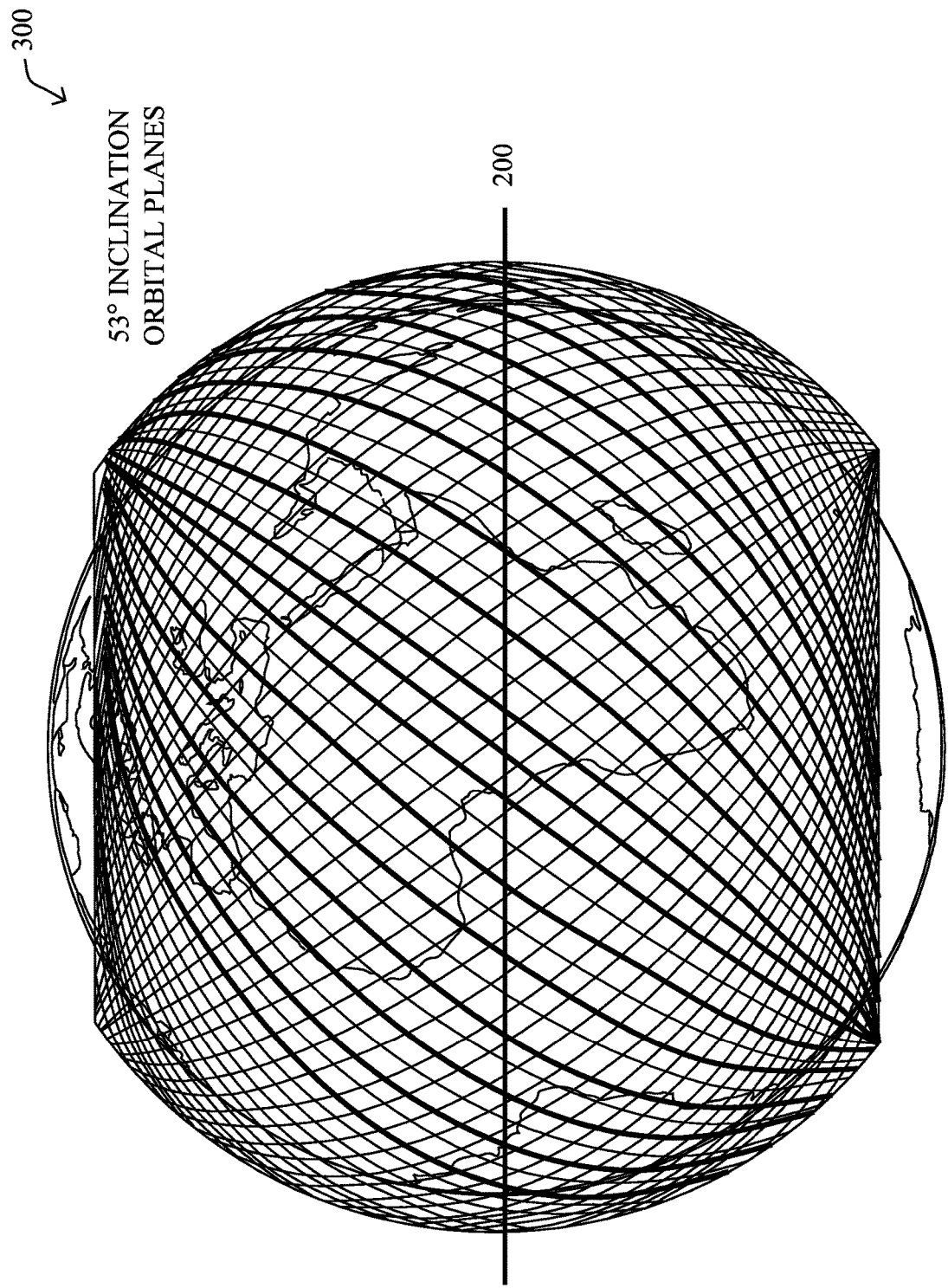
FIG. 3 illustrates example orbital shell including a collection of orbital planes at a fixed inclination.

FIG. 3 illustrates example orbital shell including a collection of orbital planes at a fixed inclination. Orbital planes are defined by circular or elliptical orbital paths taken by a satellite (e.g., satellite 210). Satellites are typically placed in sets of complementary orbital planes and connect to the distributed terrestrial elements. Orbits are often denoted by three parameters: altitude; inclination; and the crossing point with respect to the equatorial line. An orbital shell is a set of orbits (or satellites in orbit) with the same altitude and (oftentimes) inclination. Most existing satellite constellations use a single orbital shell orbiting a specific inclination. Orbital shell 300, for example, includes a collection of 53-degree orbital planes that are offset from one another based on where they cross the equatorial line 220. To understand the dynamic nature of this configuration, note that each satellite is moving independently in its respective orbit at a speed that depends on its altitude. This causes the exact position in space of each satellite to change rapidly. At the same time, the Earth rotates around its own axis and independently of the satellites, thereby creating an environment that is highly dynamic.

Figure 4:
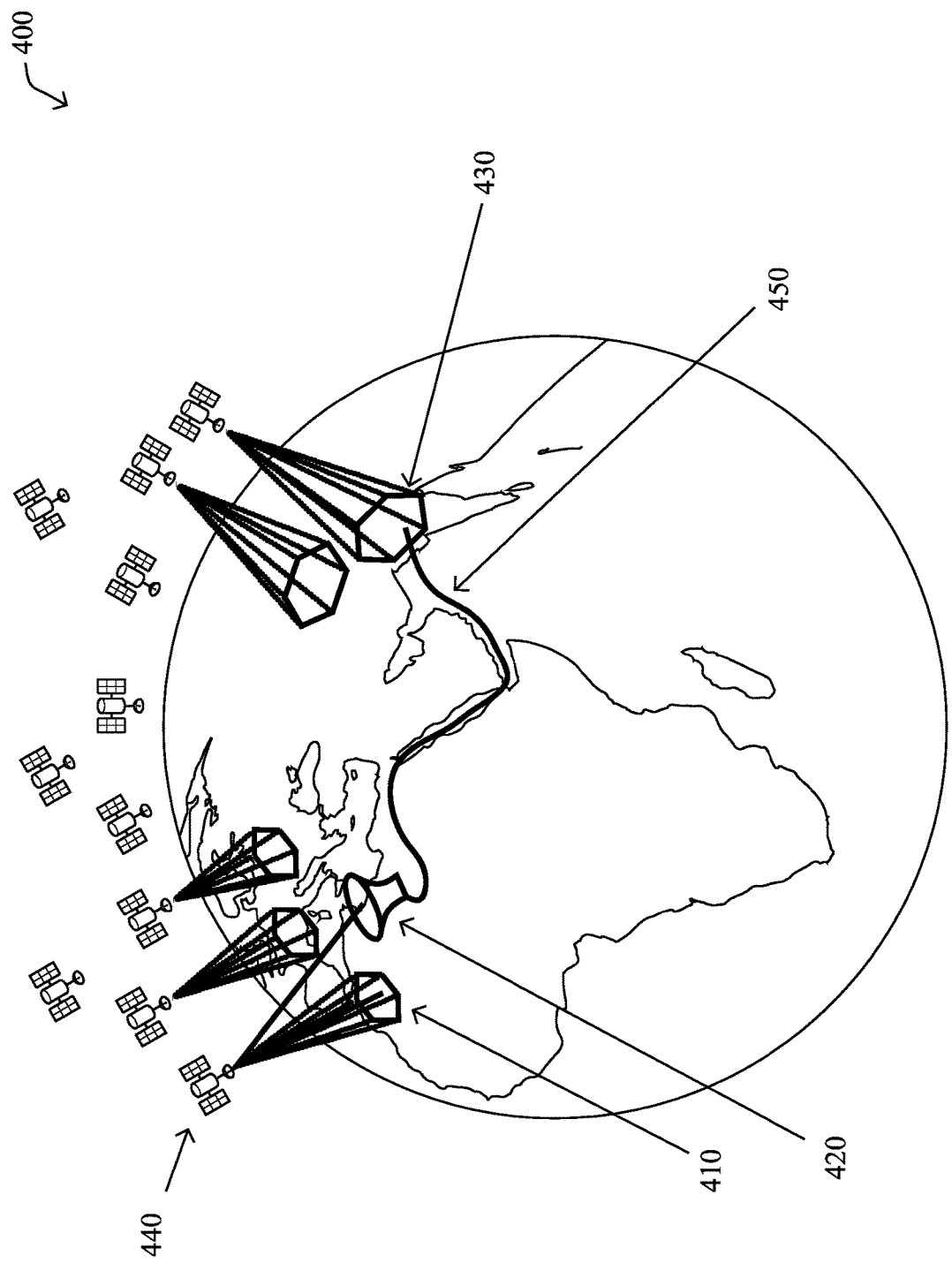
FIG. 4 illustrates an example LEO satellite network in which LEO satellites are used for connecting a user terminal to a terrestrial network via a LEO satellite network.

FIG. 4 illustrates an example LEO satellite network in which LEO satellites are used for connecting a user terminal to a terrestrial network via a LEO satellite network. As shown, the service area covered by a given satellite constellation may be divided into cells, each of which is covered by a single satellite 440 of the constellation. In this embodiment, LEO satellite network 400 includes a first cell 410 located in northern Africa, a second cell 420, also located in northern Africa, and a third cell 430 located in South Asia. A user terminal may be located in the first cell 410, a ground station may be located in the second cell 420, and an Internet server may be located in the third cell 430. As an example, the user terminal may comprise a basic, low-cost satellite dish, such as a satellite dish that connects to a user's home. The ground station may include one or more robust satellite dishes (e.g., to communicate with user terminals via satellite) and one or more terrestrial network connections (e.g., to communicate with Internet servers). The Internet server may host content of interest to the user, such as a football game that the user would like to watch.

FIG. 4 also demonstrates a forwarding plan by which the LEO satellite network 400 is used as an access network for last mile connectivity. To this end, the user terminal may communicate with its nearest ground station (e.g., the ground station located in cell 420) via satellite 440. The ground station then acts as a gateway to a terrestrial network (e.g., the Internet or private network). As an example, the ground station may act as an on-ramp through which the user terminal may reach the Internet server located in the third cell 430. Note that LEO satellite network 400 as depicted in FIG. 4 includes a single-satellite hop, which is illustrated as the hop connecting the user terminal located in cell 410 to the nearest ground station located in cell 420 via satellite 440. LEO satellite network 400 also includes a long terrestrial haul, which is illustrated as the haul connecting the ground station located in cell 420 to the Internet server located in cell 430 via a path 450 that includes undersea cables traversing the Red Sea and the Arabian Sea. For various reasons, this forwarding plan being used for last-mile connectivity tends to be non-optimal in terms of user coverage, distance traversed, and delay, as discussed in greater detail below.

As noted above, LEO satellite use is becoming increasingly ubiquitous. Several LEO satellite networks have been launched and/or are planned for launch to blanket the Earth's LEO orbits and provide broadband Internet services to most of the Earth. These LEO systems consist of not only LEO satellites, but also earthbound transceivers or ground stations serving as gateways to the Internet and user terminals for connecting Internet users to the satellite network. Communications within LEO satellite networks face several obstacles, however. For example, conventional forwarding plans that leverage the satellite as a last-mile access network, such as that shown in FIG. 5, require the user terminal and the ground station to connect to the same satellite. This requirement prevents almost all user terminals in remote terrestrial regions or on the open seas from getting Internet connectivity as the user terminals would not fall within a geographical area covered by the same satellite and ground station. Moreover, this forwarding plan is non-optimal in terms of distance traversed and delay. Terrestrial networks can add significant delay to traffic forwarding because a) optical transmission is 50% faster in space than in fiber, and b) the distance between two locations along a terrestrial path may be significantly more than the distance between the same two points along a path in space since the terrestrial path must navigate around physical obstacles (e.g., mountains, boundaries of tectonic plates, etc.).

Traditionally, using a LEO satellite network as an Internet provider has been avoided because of the complexity in inter-satellite forwarding. Each LEO satellite network, as described in detail above, consists of several shells, each shell consists of many orbital planes, and each orbital plane consists of many satellites. Satellites in different orbital planes travel at different speeds, and the orbital planes can cross each other at different angels. If considering each satellite as a node in a network, then one can consider this LEO satellite network as continuously changing. This means that each node in the network has different adjacencies at different time, and the cost for each adjacency can vary as a function of time. As a result, a ground station or a user terminal is tasked with connecting to a network that is highly dynamic, constantly changing with respect to itself as well as the ground stations and user terminals. This dynamic nature is a result of: a) the rotation of the Earth, b) the rotation of satellites in the LEO orbit with respect to Earth, and c) the rotation of different satellite orbital planes with respect to each other.

Another obstacle exists. Since a given LEO satellite and earthbound transceiver will eventually move out of range of one another, as explained with reference to FIG. 1, a handoff must occur between the earthbound transceiver and a different satellite. LEO satellites revolve at a very high orbital velocity with respect to the Earth's rotation. Consequently, the time any given LEO satellite is visible to a fixed point on Earth is no more than ten to twenty minutes, resulting in constant potential interrupted connections that necessitate frequent handoffs. Given the need for handoffs, a large number of satellites are required for the network to provide simultaneous full-Earth coverage. Even so, these handoffs must be managed intelligently in order to optimize LEO satellite-earthbound transceiver communications.

Optimization of Communications in a LEO Satellite Network

The techniques herein introduce multiple mechanisms for optimizing communications in a LEO satellite network. In some aspects, a subset of satellites in an orbital shell or sub-shell can be treated as a single, fixed access point or base station, similar to terrestrial wireless networks, and the earthbound transceivers as mobile hosts. In further aspects, handoff operations may optimized by learning the optimal time at which a handoff should occur based on key performance indicators (KPIs) such as received signal strength indicator (RSSI), relative positions of the Earth, and the like. In yet further aspects, a model for facilitating optimum forwarding in a LEO satellite network involves designating the satellite network to be used as both an access network and the Internet. According to this arrangement, user traffic is forwarded within the LEO satellite network and handed off to the ground station closest to the destination device, user, application, etc., instead of a single satellite hop and long terrestrial haul. In other aspects, such technologies as Ethernet Virtual Private Network (EVPN) technologies and Locator ID Separation Protocol (LISP) may be applied to simplify the aforementioned complexities within inter-satellite forwarding of LEO satellite networks.

Specifically, according to one or more embodiments of the disclosure as described in detail below, an earthbound transceiver in a low earth orbit (LEO) satellite network establishes a connection with a first LEO satellite from a first set of LEO satellites. The first set of LEO satellites are distributed across a first plurality of orbits including first neighboring LEO satellites of the first LEO satellite, and the first neighboring LEO satellites have a fixed or semi-fixed position relative to the first LEO satellite. The earthbound transceiver determines first signal strength values associated with the first set of LEO satellites and second signal strength values associated with a second set of LEO satellites. The second set of LEO satellites are distributed across a second plurality of orbits. The earthbound transceiver then periodically compares the first signal strength values to the second signal strength values to determine an optimal handoff time at which a handoff operation should be performed. At the optimal handoff time, the earthbound transceiver initiates the handoff operation from the first LEO satellite to a second LEO satellite from the second set of LEO satellites by disconnecting from the first LEO satellite and establishing a new connection with the second LEO satellite.

Illustratively, the techniques described herein may be performed by hardware, software, and/or firmware, such as in accordance with the LEO satellite network communication optimization process 148, which may include computer executable instructions executed by the processor(s) 120, to perform functions relating to the techniques described herein.

1. Optimizing LEO Satellite-Earthbound Transceiver Handoffs

The foundation of techniques discussed herein for optimizing handoffs in a LEO satellite network entails utilizing data forwarding techniques—specifically, Multiprotocol Label Switching (MPLS)—to pre-build pseudowires that support the handoff operations between an earthbound transceiver and different LEO satellites. MPLS, as would be appreciated by a person of ordinary skill in the art, controls the flow of network traffic by directing data through a path via labels instead of requiring complex lookups in a routing table at every stop. Pseudowires refer to an industry term for transport of any data frames over a MPLS network using MPLS for encapsulation and label distribution protocol (LDP) as a signaling mechanism. Put another way, pseudowires are an emulation of a point-to-point connection over a packet-switched network (PSN) and, in this particular context, are used to provide end-to-end services across an MPLS network. They represent basic building blocks used to create the bridge domain across which packets flow in the MPLS network. Leveraging MPLS to pre-build pseudowires on the infrastructure side allows for a smooth transition between access points/base stations through MPLS label operations.

Figure 5:
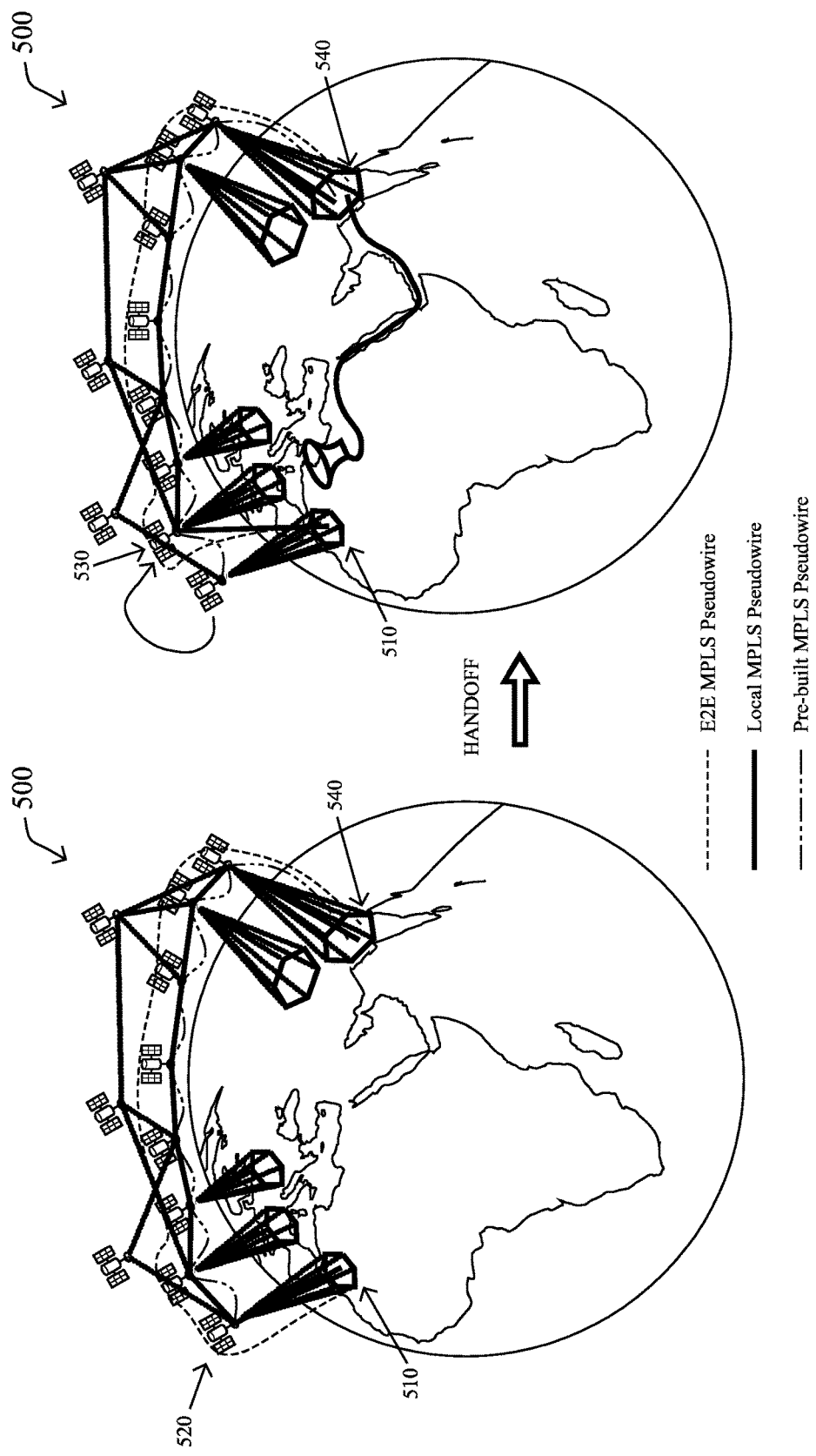
FIG. 5 illustrates an example handoff between an earthbound transceiver and satellites in a LEO satellite network.

More specifically, by treating the LEO satellites as fixed access points and the earthbound transceivers as mobile nodes, MPLS pseudowires may be used to support earthbound transceiver-LEO satellite handoff operations. FIG. 5 illustrates an example handoff between an earthbound transceiver and satellites in a LEO satellite network. As shown, LEO satellite network 500 may comprise a satellite constellation that covers a ground service area divided into cells, each of which is covered by a single satellite of the constellation. In this embodiment, an "origin" cell 510 is located in northern Africa, and a "destination" cell 540 is located in South Asia. A user terminal may be located in the origin cell 510 where network traffic may originate, while a destination device (e.g., an end-user, user terminal, application, etc.) serving as a destination for the network traffic may be located in the destination cell 540. FIG. 5 also depicts different varieties of MPLS-based pseudowires to interconnect the LEO satellites. The MPLS-based pseudowires for interconnecting the LEO satellites may comprise, for example, end-to-end (E2E) MPLS pseudowires, local MPLS pseudowires, and pre-built MPLS pseudowires, although the disclosed embodiments are not limited thereto. Notably, when the handoff in FIG. 5 occurs, the path defined by E2E MPLS pseudowires and local MPLS pseudowires, which are responsible for transporting data from origin cell 510 to destination cell 540, is adjusted to traverse satellite 530 instead of satellite 520.

Initially, the user terminal in origin cell 510 may communicate with the destination device located in destination cell 540 via satellite 520 which is the satellite nearest to the user terminal. Eventually, however, satellite 520 will no longer be visible to the user terminal. LEO satellites revolve the Earth at a very high orbital velocity; thus, satellite 520 may only be visible to an earthbound transceiver at a fixed position on the ground for ten to twenty minutes. Once satellite 520 is no longer visible, a handoff must occur whereby the user terminal's connection is transferred from satellite 520 to a nearby satellite (e.g., satellite 530). A correctly performed handoff prevents data loss, dropped connections, service interruptions, and so on.

While LEO satellite systems are highly dynamic, a key observation is that a subset of the satellites in an orbital shell (e.g., orbital shell 300) or sub-shell are relatively static with respect to one another. This means that neighboring satellites in the same orbit essentially exhibit fixed movements with respect to each other, while satellites in neighboring orbits are semi-fixed. Intersatellite communication between satellites on the same and adjacent orbits enable the satellites to travel in synchrony. The connectivity between satellites is generally provided through radio- or laser-based intersatellite links or ISLs.

Figure 6:
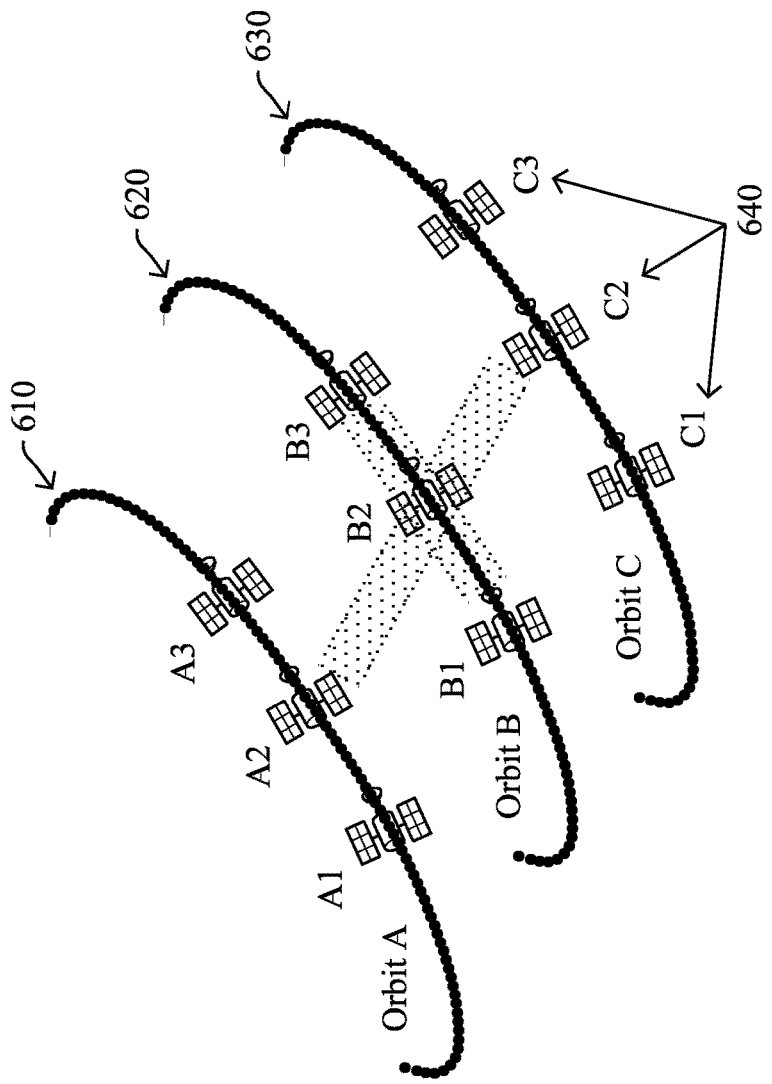
FIG. 6 illustrates an example of the relative position of a given satellite with respect to its neighboring satellites.

FIG. 6 illustrates an example of the relative position of a given satellite with respect to its neighboring satellites. As shown, a first orbital plane 610 (orbit A), a second orbital plane 620 (orbit B), and a third orbital plane 630 (orbit C) are arranged such that orbit B is positioned between and adjacent to both orbit A and orbit C. FIG. 6 further shows satellites A1, A2, and A3 as traveling on orbit A, satellites B1, B2, and B3 as traveling on orbit B, and satellites C1, C2, and C3 as traveling on orbit C. FIG. 6 demonstrates the fact that the relative position of a given satellite 640 with respect to its neighboring satellites in the same orbit (e.g., satellites B1, B2, and B3 in Orbit B) is fixed. For example, the satellite at the center (satellite B2) will maintain its relative distance to the satellite succeeding it (satellite B1) and the one preceding it (satellite B3). Furthermore, the relative position of a given satellite 640 with respect to the satellites in its neighboring orbits (e.g., satellite A2 in Orbit A, satellite B2 in Orbit B, and satellite C2 in Orbit C) is semi-fixed. For example, the relative position of the satellite at the center (satellite B2) with respect to the neighbor on its left (satellite A2) and the neighbor on its right (satellite C2) does not change significantly over time. Thus, once a connection is made between satellite B2 and its neighboring satellites, it should be possible to maintain the connection relatively easily.

With this in mind, a fundamental objective of the present disclosure is to optimize the handoff between the earthbound transceiver (e.g., user terminal) and the LEO satellites by determining the ideal time at which the handoff should occur. For instance, rather than relying on satellite data and any associated coordination, the handoff timing may be learned heuristically, such as based on RSSI values associated with neighboring subsets of satellites may be utilized for predicting the ideal handoff time. Other KPIs associated with the satellites may be utilized, as well, such as signal-to-interference-plus-noise ratio (SINR), reference signal received power (RSRP), reference signal received quality (RSRQ), packet data convergence protocol (PDCP) downlink (DL) throughput, and so on. Moreover, non-KPI measurements may be utilized for predicting the ideal handoff time, such as the position of the Earth relative to the satellite orbits. Typically, the handoff decision is made by the earthbound transceiver.

Figure 7:
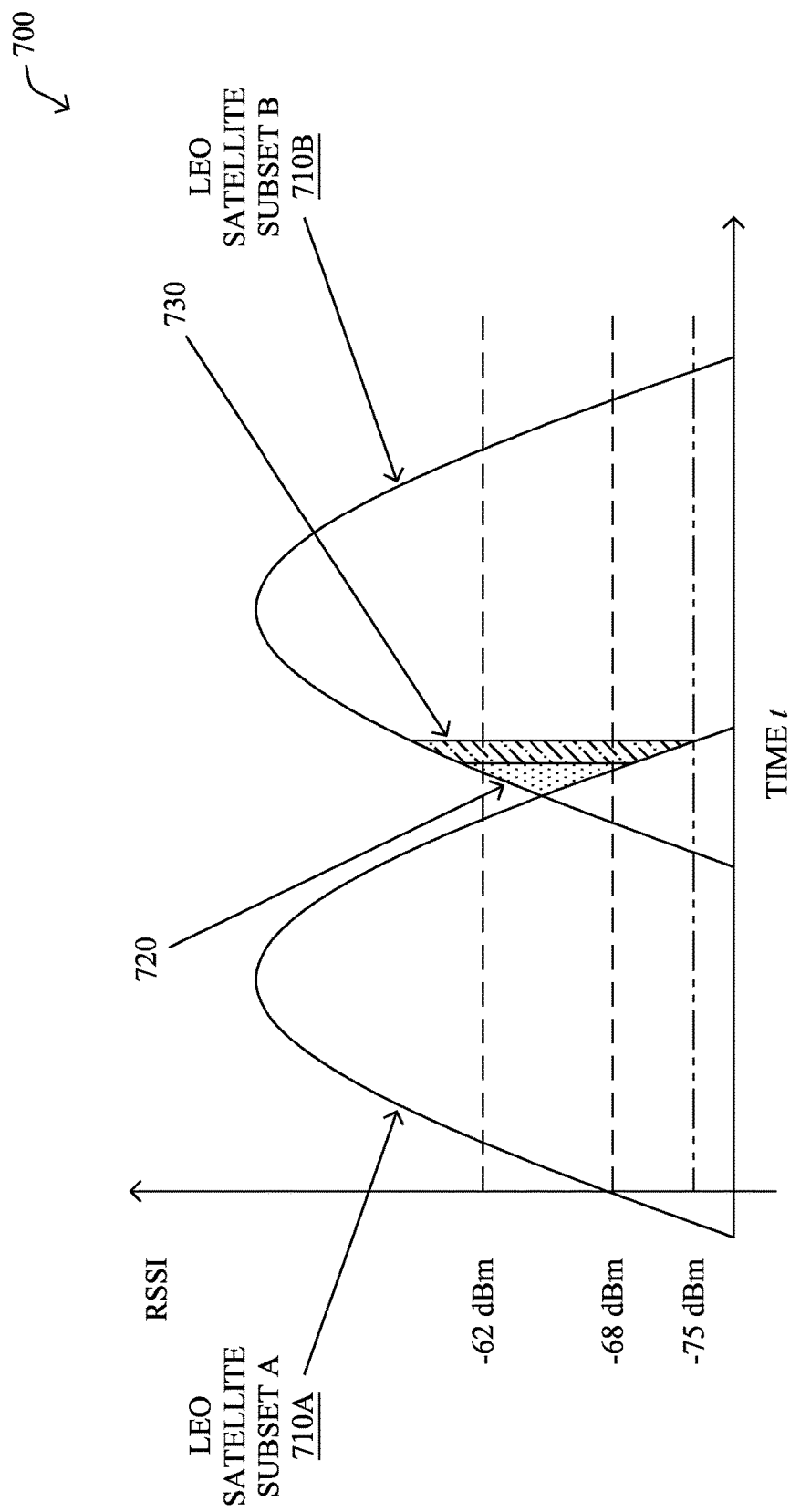
FIG. 7 illustrates an example graph showing techniques for handoff optimization based on RSSI measurements associated with the LEO satellites.

In greater detail, FIG. 7 illustrates an example graph showing techniques for handoff optimization based on RSSI measurements associated with the LEO satellites. As shown, graph 700 depicts the RSSI measurements over time associated with two subsets of LEO satellites: Subset A (curve 710A) and Subset B (curve 710B). As discussed in detail above with reference to FIG. 6, a subset of the LEO satellites in an orbital shell or sub-shell are relatively fixed or static with respect to one another. More specifically, adjacent satellites within the same orbit (e.g., satellites A1, A2, and A3 in Orbit A) essentially exhibit fixed movements with respect to each other, and thus are considered fixed in relation to each other. Meanwhile, satellites in neighboring orbits (e.g., satellite A2 in Orbit A and satellite B2 in Orbit B) are considered semi-fixed in relation to each other. A subset of LEO satellites, therefore, may be treated as fixed access points, similar to terrestrial wireless networks, while the earthbound transceivers may be treated as mobile hosts, for the purpose of optimizing handoffs between earthbound transceivers and LEO satellites.

As further discussed above (e.g., see FIGS. 2 and 3), the LEO satellites revolve around the Earth in a direction divergent from the earthbound transceiver, causing the RSSI values experienced at the earthbound transceiver to change over time depending on the position of the transceiver with respect to the LEO satellites overhead. FIG. 7 reveals that initially (i.e., time t=0) the RSSI of LEO satellite subset A begins to increase toward its maximum value. During this time, the earthbound transceiver may be connected to the LEO satellite subset A since only the satellites of LEO satellite subset A are visible to the earthbound transceiver. Shortly after hitting the maximum RSSI value for LEO satellite subset A, LEO satellite subset B becomes visible to the earthbound transceiver. At this time, as the RSSI of LEO satellite subset B begins to increase, the RSSI of LEO satellite subset A instead is decreasing. With this in mind, earthbound transceiver is still connected to LEO satellite subset A. However, the RSSI of LEO satellite subset A will eventually be lower than that of LEO satellite subset B, necessitating a handoff from LEO satellite subset A to LEO satellite subset B. The present disclosure seeks to identify the optimal time at which said handoff should occur.

Importantly, there is an optimal handoff point 720 between curves 710A and 710B at which the RSSI level of LEO satellite subset B is greater than the RSSI level of LEO satellite subset A by a predefined delta, referred to as the hysteresis threshold. The handoff hysteresis threshold as depicted in graph 700 equals 6 dBm (i.e., the difference between −62 dBm and −68 dBm). Accordingly, the connection between the earthbound transceiver and LEO satellite subset A may be handed off to LEO satellite subset B when the RSSI level of LEO satellite subset B exceeds that of LEO satellite subset A by the hysteresis threshold of 6 dBm, which occurs at time t corresponding to point 720. The region 730 is representative of the throughput gains and latency reductions resulting from the handoff operation to LEO satellite subset B performed at point 720.

To combat any issues relating to scaling, network slicing may be used since the handoff operations are largely predictable, owing to the fact that the earthbound transceiver sees and connects to the same satellites repeatedly. Thus, sub-shells (or sub-domains) may be defined for neighboring satellites so that handoffs are limited to the same sub-shell. Sub-shells can then communicate with one another via intersatellite communication links as described above. In another embodiment, satellite ephemeris data (e.g., the current and predicted trajectories of the satellites) may be used to reduce path computation signaling by inferring LSP paths using geographic routing techniques. This may also address any scaling issues by optimizing the distribution of labels and keeping the forwarding tables to a manageable size.

In certain embodiments, the earthbound transceiver may be capable of connecting to multiple satellites, simultaneously. This is particularly true with respect to ground stations with which end-users communicate. Similar to trains and other mobile nodes that can support multiple connections at once, this allows the earthbound transceiver to multi-home to different sub-meshes of the satellite network.

It should be noted that the above approaches enable LEO satellites to be employed in a variety of use cases. In one example, the LEO satellites may enable last mile access by using the satellite network as a bent-pipe to connect a user to terrestrial Internet. In another example, the LEO satellites may create a software-defined wide area network (SD-WAN) in the sky by using both a mesh on the ground and a LEO satellite mesh. In yet another example, the LEO satellites may create "Internet in the sky" by delivering both last mile and Internet service to end users.

Figure 8:
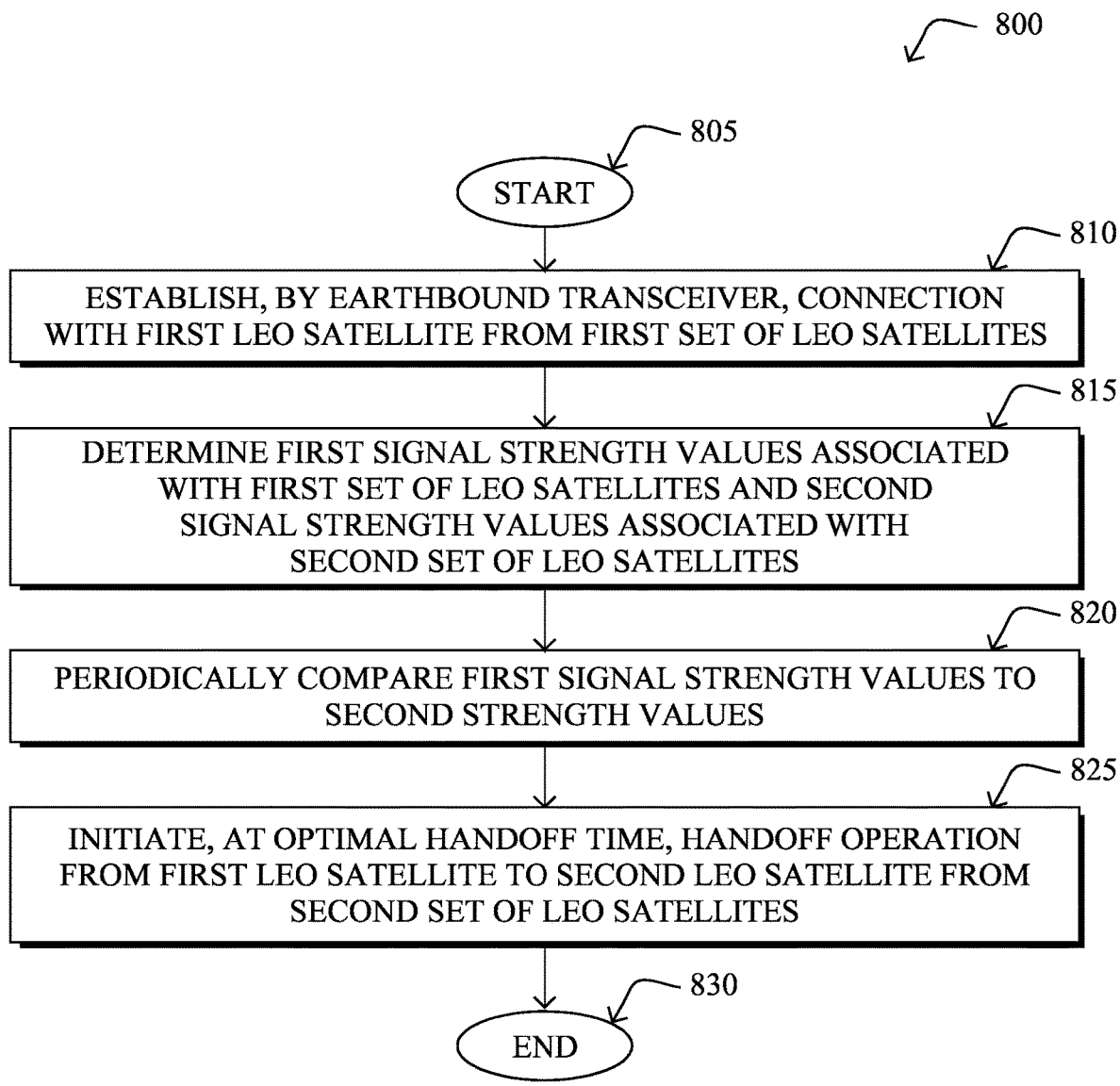
FIG. 8 illustrates an example simplified procedure for optimizing LEO satellite-earthbound transceiver handoffs.

FIG. 8 illustrates an example simplified procedure for optimizing LEO satellite-earthbound transceiver handoffs, in accordance with one or more embodiments described herein. For example, a non-generic, specifically configured device (e.g., device 100) in a network may perform procedure 800 by executing stored instructions (e.g., LEO satellite network communication optimization process 148). In some embodiments, the device may be an earthbound transceiver in a LEO satellite network. The procedure 800 may start at step 805, and continues to step 810, where, as described in greater detail above, an earthbound transceiver in a LEO satellite network may establish a connection with a first LEO satellite from a first set of LEO satellites. As discussed with reference to FIG. 6, the first set of LEO satellites may be distributed across a first plurality of orbits (e.g., Orbits A, B, and C) including first neighboring LEO satellites of the first LEO satellite, where the first neighboring LEO satellites have a fixed or semi-fixed position relative to the first LEO satellite. More specifically, any of the first neighboring LEO satellites in the same orbit as the first LEO satellite may have a fixed position relative to the first LEO satellite, and any of the first neighboring LEO satellites in an orbit adjacent to the orbit of the first LEO satellite may have a semi-fixed position relative to the first LEO satellite.

At step 815, as detailed above, the earthbound transceiver may determine first signal strength (e.g., RSSI) values associated with the first set of LEO satellites and second signal strength values associated with a second set of LEO satellites. The second set of LEO satellites may be distributed across a second plurality of orbits in a manner similar to the first set of LEO satellites (e.g., see FIG. 6). Additionally, the second set of LEO satellites may include second neighboring LEO satellites of the second LEO satellite, where the second neighboring LEO satellites have a fixed or semi-fixed position relative to the second LEO satellite. Any of the second neighboring LEO satellites in the same orbit as the second LEO satellite may have a fixed position relative to the second LEO satellite, and any of the second neighboring LEO satellites in an orbit adjacent to the orbit of the second LEO satellite may have a semi-fixed position relative to the second LEO satellite. In some embodiments, the first and second set of LEO satellites may be distinct from each other; that is, the first set of LEO satellites does not include satellites from the second set of LEO satellites, and the second set of LEO satellites does not include satellites from the first set of LEO satellites. Similarly, the first plurality of orbits of the first set of LEO satellites may be distinct of the second plurality of orbits of the second set of LEO satellites.

At step 820, as detailed above, the earthbound transceiver may periodically compare the first signal strength values associated with the first set of LEO satellites to the second signal strength values associated with the second set of LEO satellites. The comparison of signal strengths across the first and second set of LEO satellites may be performed to determine an optimal handoff time at which a handoff operation should be performed. In some embodiments, the earthbound transceiver may determine whether the second signal strength values exceed the first signal strength values at a given time by a predefined threshold amount, e.g., the handoff hysteresis threshold, as demonstrated in FIG. 7. The optimal handoff time may be established at the point in time when the second signal strength values exceed the first signal strength values by the predefined threshold amount.

At step 825, as detailed above, the earthbound transceiver may initiate the handoff operation from the first LEO satellite to a second LEO satellite from the second set of LEO satellites at the optimal handoff time. The handoff operation may be carried out by disconnecting from the first LEO satellite and establishing a new connection with the second LEO satellite. In some embodiments, the earthbound transceiver may the earthbound transceiver may select the second LEO satellite from the second set of LEO satellites based on the second LEO satellite having a highest signal strength value among the LEO satellites in the second set of LEO satellites. This would necessarily involve measuring the signal strength values of each LEO satellite in the second set of LEO satellites. In other embodiments, the earthbound transceiver may continue analyzing the signal strength values of subsequent sets of LEO satellites. For example, initiating the handoff from the first LEO satellite to the second LEO satellite, the earthbound transceiver may determine third signal strength values associated with a third set of LEO satellites. (The third set of LEO satellites may be distributed across a third plurality of orbits.) Then, in a manner similar to the above, the earthbound transceiver may periodically compare the second signal strength values associated with the second set of LEO satellites to the third signal strength values associated with the third set of LEO satellites (e.g., to determine whether the third signal strength values exceed the second signal strength values at a given time by the predefined threshold amount). Subsequent handoff operations may again be performed, and so on. In additional embodiments, the handoff operation from the first LEO satellite to the second LEO satellite may be performed using MPLS-based pseudowires in the LEO satellite network, as described above with reference to FIG. 5. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

2. Optimizing Data Forwarding in a LEO Satellite Network

Additional techniques are described herein for facilitating optimum forwarding in a LEO satellite network by designating the satellite network to be used as both an access network and the Internet. Generally speaking, the present disclosure envisions using the LEO satellites and inter-satellite forwarding links to directly connect a user terminal to a destination (such as another user terminal) or, alternatively, to connect a user terminal to a ground station closest to the destination. This optimized forwarding strategy may use a satellite network haul in lieu of a long terrestrial haul, as explained above.

Figure 9:
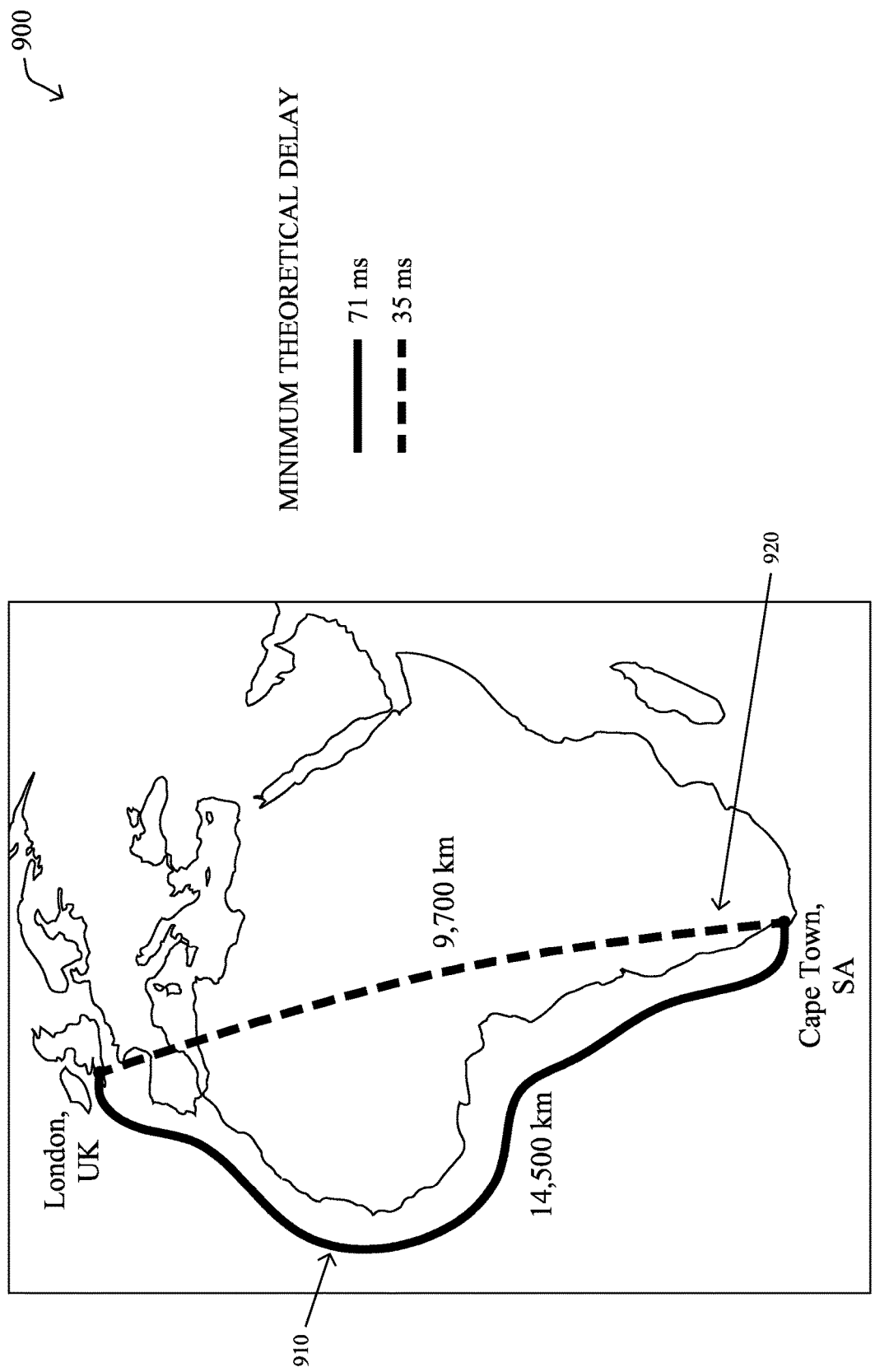
FIG. 9 illustrates an example map showing a satellite network haul in accordance with embodiments of the present disclosure.

FIG. 9 illustrates an example map showing a satellite network haul in accordance with embodiments of the present disclosure in contrast with a conventional long terrestrial haul. The map 900 depicts certain undersea cables that connect major metropolitan areas around the globe. As an example, to communicate from Cape Town in South Africa to London in the United Kingdom, the fastest terrestrial path uses the undersea fiber cable 910 bordering the west coast of Africa. It is to be appreciated that at a continental or global scale it is nearly impossible to lay the fiber in a straight path as physical, geographical obstacles have to be taken into account. As a result, this terrestrial path 910 from Cape Town to London is nearly 14,500 kilometers long.

If the two cities were instead connected through a series of LEO satellites, as proposed herein, assuming sufficient constellation sizes (e.g., hundreds or even thousands of satellites), signals can instead be sent through a series of satellites such that the signal traces a path that nearly resembles the dashed arc 920 shown in map 900 (also called the "great circle distance"). Note that path 920 is only 9,700 kilometers or approximately two-thirds the length of terrestrial path 910. In addition, note that electromagnetic waves (radio frequency as well as visible light) travel at 299,792,458 m/s in space which is nearly 50% higher than the speed of light in a typical fiber at 204,190,477 m/s. Assuming that satellites are at a distance of 340 kilometers from the surface of the Earth, then the total distance traveled would be approximately 10,380 kilometers (340 kilometers from Earth up to the satellite network, plus 9,700 kilometers across the satellite network, plus 340 kilometers from the satellite network down to Earth). Given these numbers, the satellite network is able to provide a theoretical minimum delay of only 35 milliseconds, which is less than the terrestrial fiber connection's theoretical minimum delay of 71 milliseconds.

Figure 10:
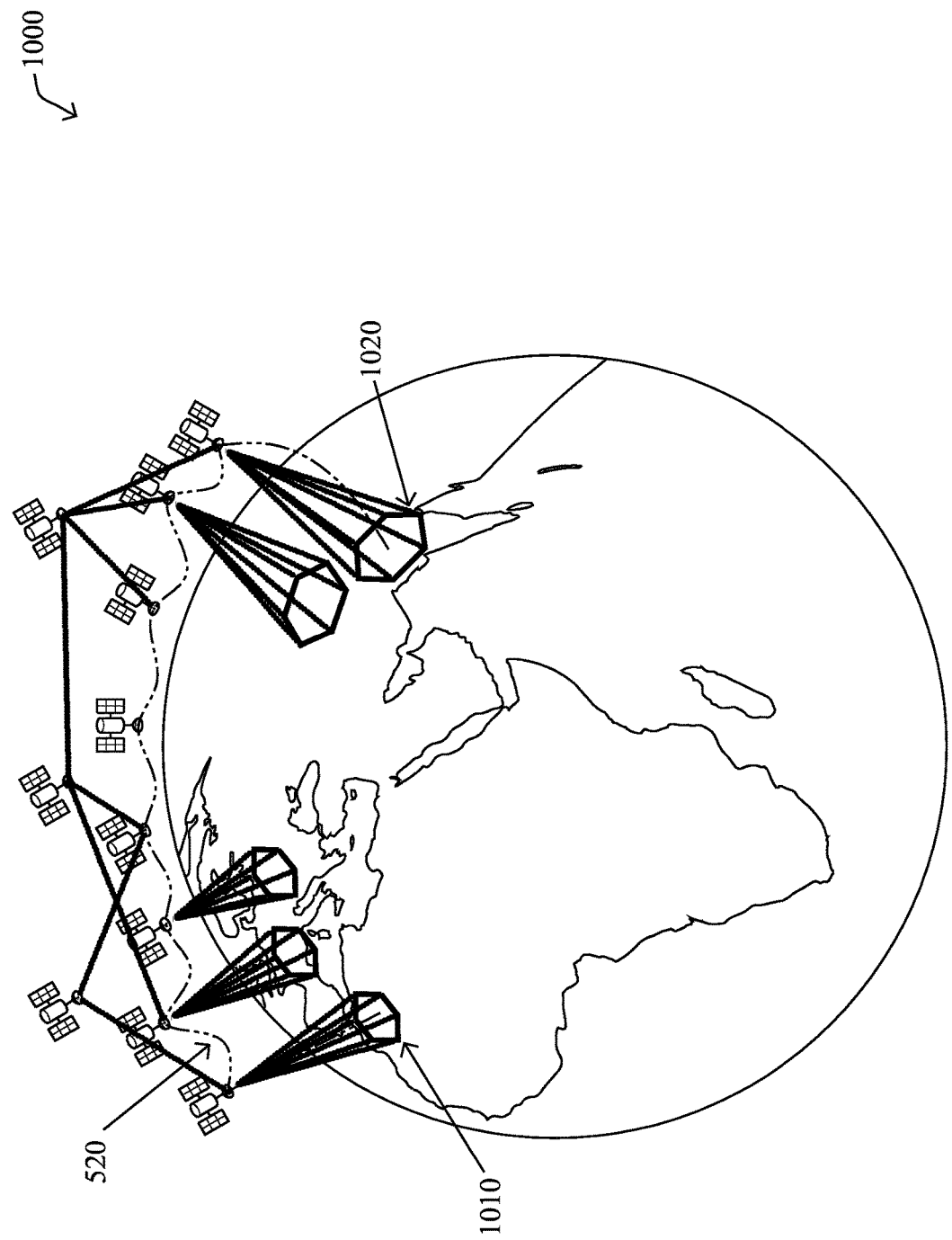
FIG. 10 illustrates an example LEO satellite network using an optimized forwarding plan in accordance with embodiments of the present disclosure.

FIG. 10 illustrates an example LEO satellite network using an optimized forwarding plan in accordance with embodiments of the present disclosure. According to the illustrated forwarding plan, user traffic may forwarded from a user terminal 1010 within the LEO satellite network 1000 along the path 1030 formed by inter-satellite forwarding links and handed off to the earthbound ground station closest to a destination device 1020. The destination device 1020 may correspond to an end-user, user terminal, application, etc. This approach differs from the single-satellite hop and long terrestrial haul shown in FIG. 5, for example. As FIG. 10 demonstrates, the LEO satellites and inter-satellite forwarding links in LEO satellite network 1000 may be employed to directly connect a user terminal 1010 to a destination 1020 (such as another user terminal) or, alternatively, to connect a user terminal to a ground station closest to the destination 1020.

To this end, the present disclosure envisions breaking a satellite shell (or sub-shell) into different meshes or sets by taking a cross-section of satellites where the position of a given satellite relative to its neighboring satellites is semi-fixed (e.g., see FIG. 6). This entails dividing up the complex and dynamic LEO satellite networks into several semi-fixed networks. Each semi-static network comprises either a satellite shell or a sub-shell with thousands of satellites in it. Each semi-fixed network can be considered as a satellite mesh that is wrapped around itself once. This means each ground station or user terminal sees two sets of orbital planes that cross each other. However, the satellites in each set move in the same direction with the same speed. Thus, the positions of the satellites in each set are semi-fixed.

Figure 11A:
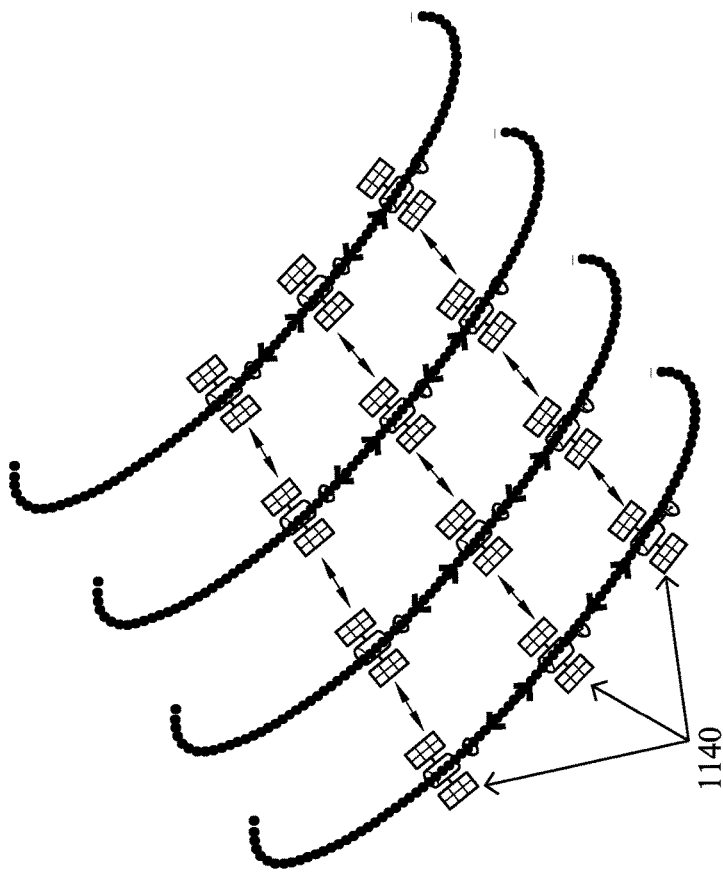
FIGS. 11A and 11B illustrates the visual deconstruction of an orbital shell into distinct meshes.
Figure 11A:
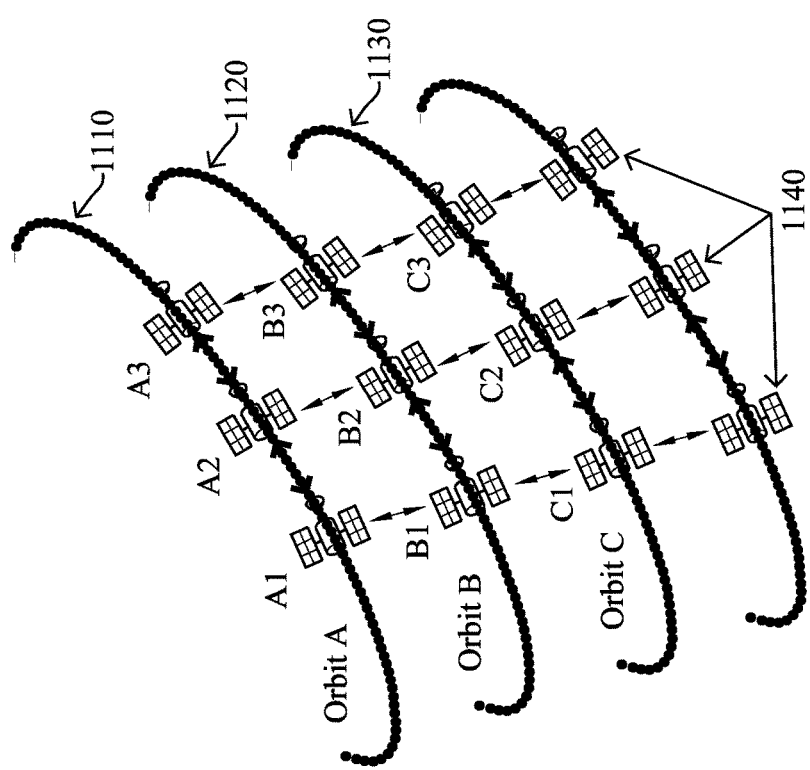

In certain embodiments, a satellite shell (or sub-shell) consisting of thousands or hundreds of satellites may be broken into two sets. Each set consists of parallel orbital planes, as shown in FIG. 11A. In particular, FIG. 11A illustrates the visual deconstruction of an orbital shell (e.g., shell 300 of FIG. 3) into two distinct meshes (or sets) 1100A and 1100B. As shown, the position of each satellite relative to its neighboring satellites in a single orbit is fixed (or semi-fixed) (e.g., the position of satellite B2 in orbit B 1120 is fixed or semi-fixed relative to satellites B1 and B3 in orbit A 1110 and orbit C 1130, respectively). The position n of each satellite 1140 relative to its neighboring satellites from the two adjacent orbits, are also semi-fixed (e.g., the position of satellite B2 is semi-fixed relative to satellites A2 and C2). Therefore, within a set, one can consider the positions of each satellite 1140 relative to its neighbors (both intra and inter orbits) as semi-fixed. Hence the network is semi-fixed. Based on this model, LEO mega-constellations may be broken into multiple networks where each network consists of two meshes (e.g., 1100A and 1100B).

An earthbound transceiver on the ground (e.g., user terminal, ground station, etc.) may identify these two meshes 1100A and 1100B and connect to the nearest satellite 1140 in each mesh (dual-homing) or to the nearest two (or more) satellites 1140 in each mesh (multi-homing). When meshes 1100A and 1100B pass over the earthbound transceiver, and the earthbound transceiver needs to move from one satellite to another satellite for a given set, the reference point may then change so as to consider the earthbound transceiver on the ground with respect to this semi-static network (instead of looking at the satellites moving with respect to an earthbound transceiver). Accordingly, an earthbound transceiver may be seen as akin to a host in Data Center (DC) terms. The earthbound transceiver is multi-homed to a set of leaves where it can move from one set of leaves to another set. Furthermore, this move is deterministic and can be scheduled ahead of time resembling very much a Virtual Machine (VM) or a workload in a DC network moving from one set of multi-homing leaves to another set of multi-homing leaves. Therefore, such modeling can reduce the complexity of mega-constellation and earthbound transceiver dynamic systems into a network similar to DC network with analogous multi-homing and workload mobility paradigm. Furthermore, optimum inter-satellite forwarding can be used for technologies that have multi-homing capability with workload mobility functionality, such as EVPN and LISP.

Certain embodiments of the present disclosure assume that the number of hops between the source and destination satellites in the two sets are roughly the same (which typically is the case). Furthermore, certain embodiments assume that the link cost between two adjacent satellites in the same orbit versus two adjacent orbits are also roughly the same (which, again, typically is the case). Based on these two assumptions, the ground (or home) station may perform random hashing of its traffic flows across its RF links to the satellites in these two sets. This is analogous to a host being multi-homed to multiple leaves in a DC and the host runs "all-active" multi-homing. The random hashing may facilitate load balancing, for example.

Figure 11B:
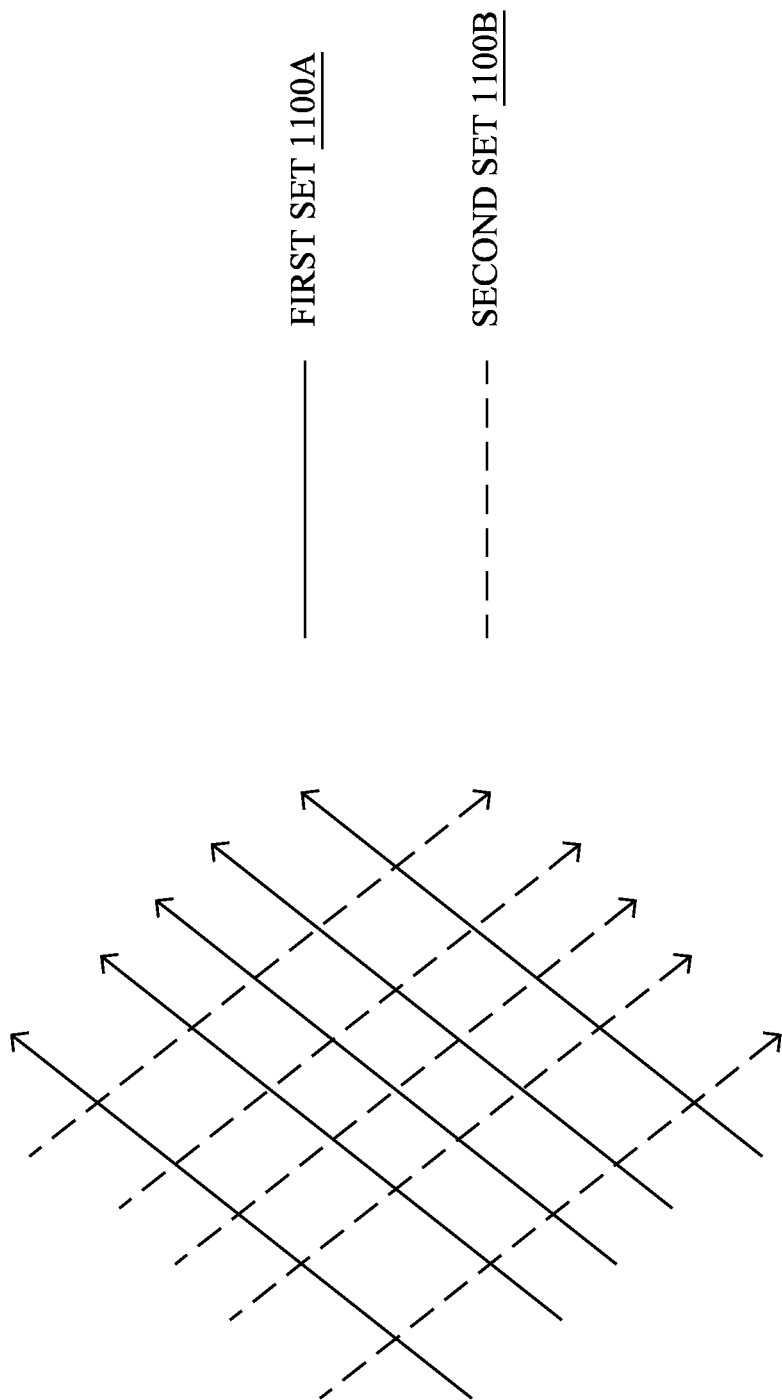

For ease of illustration, FIG. 11A shows the two meshes (sets) 1100A and 1100B of satellites 1140 separately. The orbital paths of meshes 1100A and 1100B may intersect (e.g., see orbital shell of FIG. 3), however. Thus, FIG. 11B illustrates an example visual deconstruction of an orbital shell into two distinct, intersecting meshes. In certain embodiments, satellites in first set 1100A are oriented in a generally northeastern trajectory, and satellites in second set 1100B are oriented in a generally southeastern trajectory. Note that at some point, the trajectory would reverse (e.g., on the other side of the earth, satellites in the first set 1100A would be oriented in a generally southeastern trajectory, and satellites in the second set 1100B would be oriented in a generally northeastern trajectory). From the perspective of an earthbound transceiver at a given location on earth, different satellites would be visible at different times, but both meshes 1100A and 1100B would remain visible at all times. Thus, to connect to a mesh, the earthbound transceiver may connect to whichever satellite is associated with the mesh and currently overhead. To maintain the connection with the mesh when the satellite begins to move out of visibility, the earthbound transceiver may perform a handoff to a next satellite associated with the same mesh (e.g., a satellite that is moving into visibility), in the optimized manner described above, for example. The connected satellite may communicate with one of its neighboring satellites, which may in turn communicate with one of its neighboring satellites, and so on in order to provide an inter-satellite haul. As discussed above, a mesh may include a subset of satellites that maintain semi-constant positions relative to their neighbors (e.g., see FIG. 4). Thus, communication between a satellite 1140 and its neighboring satellites in the mesh should be possible to maintain relatively easily.

As further discussed above, a given earthbound transceiver (e.g., user terminal, ground station, etc.) may connect with both meshes 1100A and 1100B simultaneously (dual-homing). In some embodiments, dual-homing may be used for load-balancing traffic evenly between meshes 1100A and 1100B or to achieve a particular Quality of Service (QoS). Furthermore, satellite networks traditionally have been modeled from the perspective that the Earth is stationary, and the satellites are moving around the Earth. By contrast, embodiments of the present disclosure model the satellite network from the perspective that satellites have a constant position and the Earth is rotating, which causes a user located on Earth to move from one satellite to the next. In this manner, the satellite network may be considered analogous to a mobile network (e.g., which satellite the user connects to can change, but the positions of satellites remain semi-constant relative to neighboring satellites that are associated with the same mesh).

According to certain embodiments, a method comprises connecting to a first satellite, the first satellite associated with a first set of satellites; and connecting to a second satellite while connected to the first satellite, the second satellite associated with a second set of satellites. The first set does not include satellites from the second set, and the second set does not include satellites from the first set. In certain embodiments the first set of satellites comprises neighboring satellites of the first satellite, the neighboring satellites of the first satellite having a semi-constant position relative to the first satellite. In certain embodiments, the second set of satellites comprises neighboring satellites of the second satellite, the neighboring satellites of the second satellite having a semi-constant position relative to the second satellite.

According to certain embodiments, a method comprises associating a first satellite with a first set of satellites; determining whether a second satellite has a semi-constant position relative to the first satellite; and, in response to determining that the second satellite has a semi-constant position relative to the first satellite, associating the second satellite with the first set of satellites. In certain embodiments, the method further comprises determining whether a third satellite has a semi-constant position relative to the first satellite; and, in response to determining that the third satellite does not have a semi-constant position relative to the first satellite, associating the third satellite with a second set of satellites.

According to certain embodiments, a method comprises sending data from a first terrestrial location to a second terrestrial location via a satellite network, the satellite network comprising one or more inter-satellite forwarding links.

According to an embodiment, a system may include one or more processors and one or more computer-readable non-transitory storage media. The one or more computer-readable non-transitory storage media comprise instructions that, when executed by the one or more processors, cause one or more components of the system to perform operations of any of the methods described herein.

According to yet another embodiment, one or more computer-readable non-transitory storage media may embody instructions that, when executed by a processor, cause the performance of operations of any of the methods described herein.

Technical advantages of certain embodiments of this disclosure may include one or more of the following. Certain embodiments determine sets of satellites. The sets of satellites are determined such that the position of a given satellite relative to its neighboring satellites remains semi-constant as the satellites traverse their respective orbits. By determining the sets in this manner, certain embodiments may allow connections to be maintained between satellites belonging to the same set for relatively long periods of time. Connections between satellites can be used for inter-satellite forwarding of network traffic. For example, certain embodiments may use the satellite network both as an access network and an inter-satellite forwarding network. Certain embodiments may increase network coverage area (e.g., the network need not be constrained to situations where a user terminal and a ground station must both be serviced by the same satellite). Certain embodiments may reduce delays (e.g., communicating traffic from point A to point B via inter-satellite forwarding may take less time than that which would otherwise be required to communicate the same traffic from point A to point B via terrestrial networks).

Furthermore, the techniques described herein allow for optimized handoffs between an earthbound transceiver and LEO satellites that enhance performance metrics relating to user experience such as quality of service (QOS), for example. The optimization of such handoffs should result in fewer dropped connections and interruptions. Principles of the present disclosure should have widespread utility across any application in which Internet connectivity is provided to users via LEO satellites.

While there have been shown and described illustrative embodiments that provide for optimization of communications in a LEO satellite network, it is to be understood that various other adaptations and modifications may be made within the spirit and scope of the embodiments herein. For example, while certain embodiments are described herein with respect to LEO satellites, specifically, it may be possible to apply the same or similar principles to other types of satellites, such as MEO or HEO satellites. In addition, it should be understood that none of the aforementioned embodiments are mutually exclusive to each other. Principles or techniques from a given embodiment are relevant to and may be applied in another embodiment, as would be appreciated by a person of ordinary skill in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method comprising:
establishing, by an earthbound transceiver in a low earth orbit (LEO) satellite network, a connection with a first LEO satellite from a first set of LEO satellites, wherein the first set of LEO satellites are distributed across a first plurality of orbits including first neighboring LEO satellites of the first LEO satellite, the first neighboring

LEO satellites having a fixed or semi-fixed position relative to the first LEO satellite;

determining, by the earthbound transceiver, first signal strength values associated with the first set of LEO satellites and second signal strength values associated with a second set of LEO satellites, wherein the second set of LEO satellites are distributed across a second plurality of orbits;

periodically comparing, by the earthbound transceiver, the first signal strength values associated with the first set of LEO satellites to the second signal strength values associated with the second set of LEO satellites to determine an optimal handoff time at which a handoff operation should be performed; and initiating, by the earthbound transceiver and at the optimal handoff time, the handoff operation from the first LEO satellite to a second LEO satellite from the second set of LEO satellites by disconnecting from the first LEO satellite and establishing a new connection with the second LEO satellite.

2. The method as in claim 1, wherein any of the first neighboring LEO satellites in a same orbit as the first LEO satellite have a fixed position relative to the first LEO satellite, and any of the first neighboring LEO satellites in an orbit adjacent to an orbit of the first LEO satellite have a semi-fixed position relative to the first LEO satellite.

3. The method as in claim 1, wherein the first set of LEO satellites does not include satellites from the second set of LEO satellites, and the second set of LEO satellites does not include satellites from the first set of LEO satellites.

4. The method as in claim 1, further comprising:
selecting, by the earthbound transceiver, the second LEO satellite from the second set of LEO satellites based on the second LEO satellite having a highest signal strength value among LEO satellites in the second set of LEO satellites.

5. The method as in claim 1, wherein the second set of LEO satellites includes second neighboring LEO satellites of the second LEO satellite, the second neighboring LEO satellites having a fixed or semi-fixed position relative to the second LEO satellite.

6. The method as in claim 5, wherein any of the second neighboring LEO satellites in a same orbit as the second LEO satellite have a fixed position relative to the second LEO satellite, and any of the second neighboring LEO satellites in an orbit adjacent to an orbit of the second LEO satellite have a semi-fixed position relative to the second LEO satellite.

7. The method as in claim 1, further comprising, after initiating the handoff operation from the first LEO satellite to the second LEO satellite:
determining, by the earthbound transceiver, third signal strength values associated with a third set of LEO satellites, wherein the third set of LEO satellites are distributed across a third plurality of orbits; and
periodically comparing, by the earthbound transceiver, the second signal strength values associated with the second set of LEO satellites to the third signal strength values associated with the third set of LEO satellites to determine whether the third signal strength values exceed the second signal strength values at a given time by a predefined threshold amount.

8. The method as in claim 1, wherein the handoff operation from the first LEO satellite to the second LEO satellite is performed using MPLS-based pseudowires in the LEO satellite network.

9. The method as in claim 1, wherein periodically comparing the first signal strength values to the second signal strength values to determine the optimal handoff time comprises:
determining, by the earthbound transceiver, whether the second signal strength values exceed the first signal strength values at a given time by a predefined threshold amount,
wherein the handoff operation from the first LEO satellite to the second LEO satellite is initiated in response to determining that the second signal strength values exceed the first signal strength values by the predefined threshold amount.

10. An apparatus, comprising:
one or more network interfaces to communicate with a low earth orbit (LEO) satellite network;
a processor coupled to the one or more network interfaces and configured to execute one or more processes; and
a memory configured to store a process that is executable by the processor, the process when executed operable to:
establish a connection with a first LEO satellite from a first set of LEO satellites, wherein the first set of LEO satellites are distributed across a first plurality of orbits including first neighboring LEO satellites of the first LEO satellite, the first neighboring LEO satellites having a fixed or semi-fixed position relative to the first LEO satellite;
determine first signal strength values associated with the first set of LEO satellites and second signal strength values associated with a second set of LEO satellites, wherein the second set of LEO satellites are distributed across a second plurality of orbits;
periodically compare the first signal strength values associated with the first set of LEO satellites to the second signal strength values associated with the second set of LEO satellites to determine an optimal handoff time at which a handoff operation should be performed; and
initiate, at the optimal handoff time, the handoff operation from the first LEO satellite to a second LEO satellite from the second set of LEO satellites by disconnecting from the first LEO satellite and establishing a new connection with the second LEO satellite.

11. The apparatus as in claim 10, wherein any of the first neighboring LEO satellites in a same orbit as the first LEO satellite have a fixed position relative to the first LEO satellite, and any of the first neighboring LEO satellites in an orbit adjacent to an orbit of the first LEO satellite have a semi-fixed position relative to the first LEO satellite.

12. The apparatus as in claim 10, wherein the first set of LEO satellites does not include satellites from the second set of LEO satellites, and the second set of LEO satellites does not include satellites from the first set of LEO satellites.

13. The apparatus as in claim 10, wherein the process when executed is further operable to:
select the second LEO satellite from the second set of LEO satellites based on the second LEO satellite having a highest signal strength value among LEO satellites in the second set of LEO satellites.

14. The apparatus as in claim 10, wherein the second set of LEO satellites includes second neighboring LEO satellites of the second LEO satellite, the second neighboring LEO satellites having a fixed or semi-fixed position relative to the second LEO satellite.

15. The apparatus as in claim 14, wherein any of the second neighboring LEO satellites in a same orbit as the second LEO satellite have a fixed position relative to the second LEO satellite, and any of the second neighboring LEO satellites in an orbit adjacent to an orbit of the second LEO satellite have a semi-fixed position relative to the second LEO satellite.

16. The apparatus as in claim 10, wherein, after initiating the handoff operation from the first LEO satellite to the second LEO satellite, the process when executed is further operable to:
determine third signal strength values associated with a third set of LEO satellites, wherein the third set of LEO satellites are distributed across a third plurality of orbits; and
periodically analyze the second signal strength values associated with the second set of LEO satellites and the third signal strength values associated with the third set of LEO satellites to determine whether the third signal strength values exceed the second signal strength values at a given time by a predefined threshold amount.

17. The apparatus as in claim 10, wherein the handoff operation from the first LEO satellite to the second LEO satellite is performed using MPLS-based pseudowires in the LEO satellite network.

18. The apparatus as in claim 10, wherein the apparatus periodically compares the first signal strength values to the second signal strength values to determine the optimal handoff time by:
determining whether the second signal strength values exceed the first signal strength values at a given time by a predefined threshold amount,
wherein the handoff operation from the first LEO satellite to the second LEO satellite is initiated in response to determining that the second signal strength values exceed the first signal strength values by the predefined threshold amount.

19. A tangible, non-transitory, computer-readable medium that stores program instructions that cause an earthbound transceiver in a low earth orbit (LEO) satellite network to perform a process comprising:
establishing, at the earthbound transceiver, a connection with a first LEO satellite from a first set of LEO satellites, wherein the first set of LEO satellites are distributed across a first plurality of orbits including first neighboring LEO satellites of the first LEO satellite, the first neighboring LEO satellites having a fixed or semi-fixed position relative to the first LEO satellite;
determining, by the earthbound transceiver, first signal strength values associated with the first set of LEO satellites and second signal strength values associated with a second set of LEO satellites, wherein the second set of LEO satellites are distributed across a second plurality of orbits;
periodically comparing, by the earthbound transceiver, the first signal strength values associated with the first set of LEO satellites to the second signal strength values associated with the second set of LEO satellites to determine an optimal handoff time at which a handoff operation should be performed; and
initiating, by the earthbound transceiver and at the optimal handoff time, the handoff operation from the first LEO satellite to a second LEO satellite from the second set of LEO satellites by disconnecting from the first LEO satellite and establishing a new connection with the second LEO satellite.

20. The tangible, non-transitory, computer-readable medium as in claim 19, wherein:
the second set of LEO satellites includes second neighboring LEO satellites of the second LEO satellite, the second neighboring LEO satellites having a fixed or semi-fixed position relative to the second LEO satellite,
any of the second neighboring LEO satellites in a same orbit as the second LEO satellite have a fixed position relative to the second LEO satellite, and
any of the second neighboring LEO satellites in an orbit adjacent to an orbit of the second LEO satellite have a semi-fixed position relative to the second LEO satellite.

* * * * *